US012798657B2

(12) United States Patent
Ban et al.

(10) Patent No.: US 12,798,657 B2
(45) Date of Patent: Nov. 17, 2026

(54) STEERING SUPPORT

(71) Applicant: FUTABA INDUSTRIAL CO., LTD., Aichi (JP)

(72) Inventors: Norimitsu Ban, Aichi (JP); Kaoru Tsuge, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 19/404,476

(22) Filed: Dec. 1, 2025

(65) Prior Publication Data

US 2026/0167252 A1 Jun. 18, 2026

(30) Foreign Application Priority Data

Dec. 13, 2024 (JP) ................................ 2024-218646

(51) Int. Cl.
*B62D 25/14* (2006.01)
*B62D 1/16* (2006.01)

(52) U.S. Cl.
CPC ............ *B62D 1/16* (2013.01); *B62D 25/145* (2013.01); *B62D 25/147* (2013.01)

(58) Field of Classification Search
CPC .................................................. B62D 25/145
See application file for complete search history.

(56) References Cited

U.S. PATENT DOCUMENTS 5,123,696 A * 6/1992 Watari ................ B62D 25/088 296/30
2004/0197528 A1* 10/2004 Roberts .................. B29C 49/04 428/174
2007/0006986 A1* 1/2007 Derleth ............. B60H 1/00564 162/234
2021/0253154 A1 8/2021 Nishizawa et al.
2024/0208590 A1* 6/2024 Kang .................... B62D 25/08

FOREIGN PATENT DOCUMENTS

DE 3437438 A1 * 4/1953
DE 10101927 A1 * 7/2002 .......... B62D 25/145
FR 1025298 A * 4/1986
FR 2881393 A1 * 8/2006 .......... B62D 25/145
GB 470698 A * 8/1937 ............ B62D 25/00
JP 3724682 B2 * 12/2005 .......... B62D 25/145
JP 2021115991 A 8/2021
WO WO-2005035339 A1 * 4/2005 ............ B62D 25/14
WO WO-2007135262 A1 * 11/2007 .......... B62D 29/007

* cited by examiner

*Primary Examiner* — Nicole T Verley
(74) *Attorney, Agent, or Firm* — David D. Brush; Westman, Champlin & Koehler, P.A.

(57) ABSTRACT

A steering support includes a lower member and an upper member that includes a plate member having a plate thickness smaller than that of the lower member. The lower member includes a front lower flange and a rear lower flange. The upper member includes a front upper flange and a rear upper flange, each of which includes an elongated portion and a folded portion. The folded portion of the front upper flange is welded to the elongated portion and the front lower flange while being in surface contact with at least one of the elongated portion of the front upper flange or the front lower flange. The folded portion of the rear upper flange is welded to the elongated portion and the rear lower flange while being in surface contact with at least one of the elongated portion of the rear upper flange or the rear lower flange.

7 Claims, 9 Drawing Sheets

STEERING SUPPORT

CROSS-REFERENCE TO RELATED APPLICATIONS

This application claims the benefit of priority based on Japanese patent application No. 2024-218646 filed on Dec. 13, 2024 with the Japan Patent Office, and the entire disclosure of which is incorporated herein by reference.

BACKGROUND

The present disclosure relates to a steering support that supports a steering of a vehicle from above.

For example, Japanese Unexamined Patent Application Publication No. 2021-115991 discloses a steering support that supports a steering of a vehicle from above. The steering support described in Japanese Unexamined Patent Application Publication No. 2021-115991 includes a main body. The main body includes a lower member and an upper member, each of which includes a plate member. The lower member and the upper member each include a front flange and a rear flange. The front flanges of the lower member and the upper member are welded to each other, and the rear flanges of the lower member and the upper member are welded to each other.

SUMMARY

In recent years, carbon neutrality has been promoted. According to the present inventors, in order to achieve carbon neutrality with respect to vehicles, for example, weight reduction of components mounted in a vehicle is effective. The present inventors have studied weight reduction of a steering support as a component mounted in a vehicle. In order to achieve the weight reduction of the component, it is conceivable to reduce the plate thickness of a plate included in the steering support. However, since high rigidity is required for the steering support from the viewpoint of collision safety performance of the vehicle, it may be difficult, for example, to uniformly reduce the thickness of the plate included in the steering support.

In one aspect of the present disclosure, it is desirable to provide a steering support that can achieve weight reduction while maintaining rigidity.

One aspect of the present disclosure is a steering support configured to be mounted in a vehicle and to support a steering of the vehicle from above, and the steering support includes a lower member and an upper member. The lower member includes a plate member. The upper member includes a plate member having a plate thickness smaller than a plate thickness of the lower member. The upper member is arranged above the lower member. The lower member includes a lower main body, a front lower flange, and a rear lower flange. The lower main body is curved downward in a convex shape in a cross-section taken along a front-rear direction of the vehicle. The front lower flange extends from a front edge of the lower main body and the rear lower flange extends from a rear edge of the lower main body. The upper member includes an upper main body, a front upper flange, and a rear upper flange. The upper main body is curved upward in a convex shape in a cross-section taken along the front-back direction of the vehicle and forms a space between the upper main body and the lower main body. The front upper flange extends from a front edge of the upper main body and the rear upper flange extends from a rear edge of the upper main body. Each of the front upper flange and the rear upper flange includes an elongated portion and a folded portion. The elongated portion extends from the upper main body. The folded portion is formed by folding back a first end portion of the elongated portion, the first end portion being opposite a second end portion of the elongated portion, the second end portion being directly connected to the upper main body. The folded portion of the front upper flange is welded to the elongated portion of the front upper flange and the front lower flange while being in surface contact with at least one of the elongated portion of the front upper flange or the front lower flange. The folded portion of the rear upper flange is welded to the elongated portion of the rear upper flange and the rear lower flange while being in surface contact with at least one of the elongated portion of the rear upper flange or the rear lower flange.

With this configuration, weight reduction can be achieved while maintaining the rigidity of the steering support.

In one aspect of the present disclosure, in each of the front upper flange and the rear upper flange, the folded portion may be in surface contact with at least the elongated portion. A ratio of a total plate thickness of the front upper flange to a plate thickness of the front lower flange may be 0.5 or more and 2.0 or less. A ratio of a total plate thickness of the rear upper flange to a plate thickness of the rear lower flange is 0.5 or more and 2.0 or less. With this configuration, the rigidity of the steering support can be more easily maintained.

In one aspect of the present disclosure, the folded portion may include a spacer portion and a contact portion. The spacer portion is formed by folding back the elongated portion so as to form a space between the spacer portion and the elongated portion. The contact portion extends from a first end portion of the spacer portion, the first end portion being opposite a second end portion of the spacer portion, the second end portion being directly connected to the elongated portion, the contact portion being in surface contact with at least the elongated portion. With this configuration, the rigidity of the steering support can be more easily maintained.

In one aspect of the present disclosure, in each of the front upper flange and the rear upper flange, the spacer portion may be formed by folding back in a direction away from the lower member. With this configuration, the rigidity of the steering support can be more easily maintained.

In one aspect of the present disclosure, in each of the front upper flange and the rear upper flange, the folded portion may have a dimension of 9 mm or more from an end edge directly connected to the elongated portion to an end edge opposite the end edge directly connected to the elongated portion. With this configuration, the rigidity of the steering support can be more easily maintained.

BRIEF DESCRIPTION OF THE DRAWINGS

Several embodiments of the present disclosure will be described hereinafter by way of example with reference to the accompanying drawings, in which.

DETAILED DESCRIPTION OF EXEMPLARY EMBODIMENTS

1. First Embodiment

[1-1. Configuration]

Figure 1:
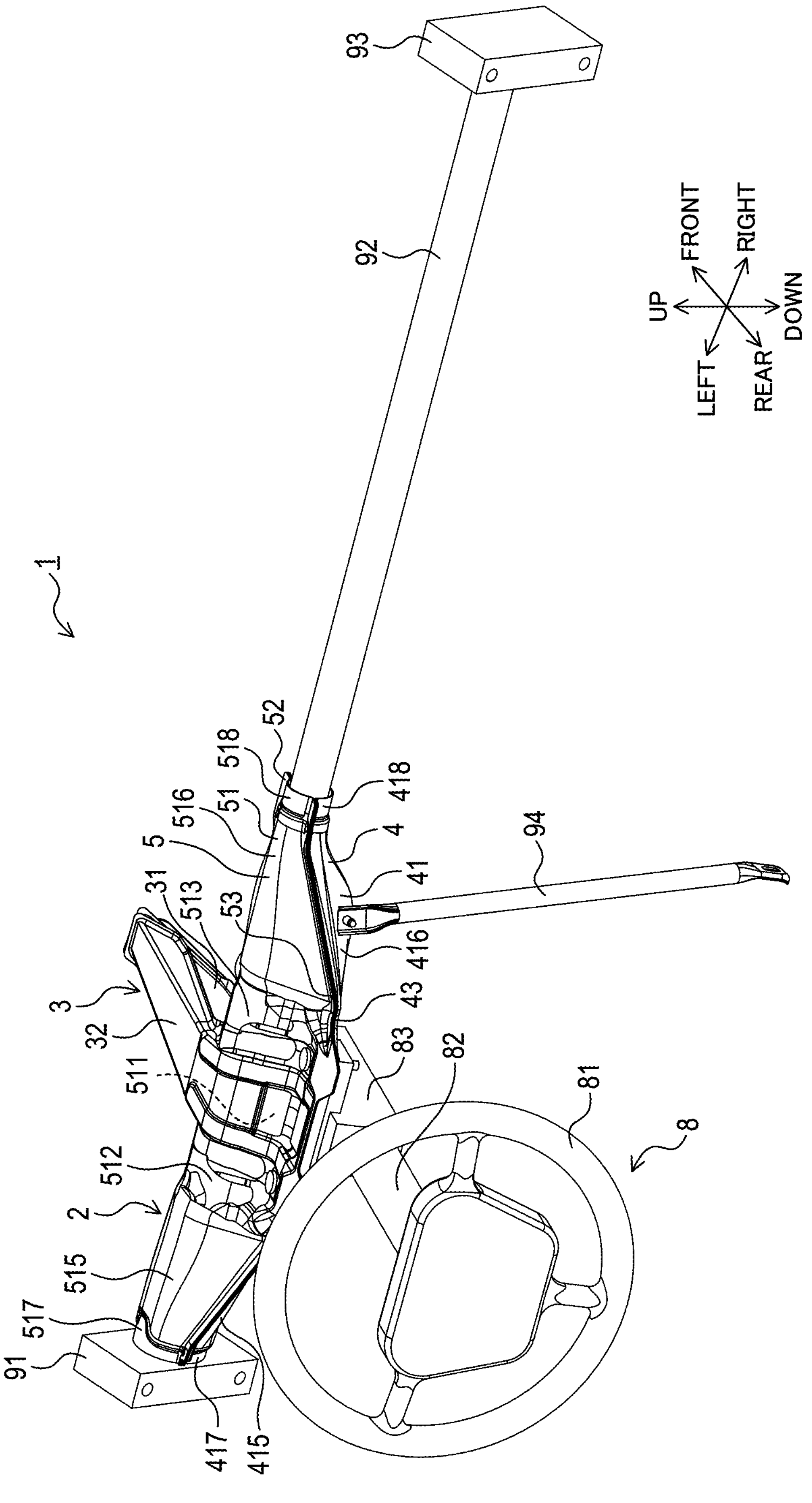
FIG. 1 is a perspective view of a steering support and a steering of a first embodiment as seen from the rear.

A steering support 1 shown in FIG. 1 is a member to be mounted in a vehicle. In the following description and drawings, the terms "front/rear," "up/down," and "left/right" respectively refer to the front and rear, the up and down, and the left and right as viewed from a driver's seat, in a state where the steering support 1 is mounted in a vehicle. The steering support 1 is for a vehicle in which the driver's seat is provided on the left side. The steering support may also be for a vehicle in which the driver's seat is provided on the right side.

As shown in FIG. 1, the steering support 1 is configured to support a steering 8 of the vehicle from above. The steering 8 includes a steering wheel 81, a steering shaft 82, and a steering column 83. The steering wheel 81 is configured to be rotated by a driver. The steering shaft 82 is a rod-shaped member connected to the steering wheel 81. The steering shaft 82 is configured to transmit a rotational operation of the steering wheel 81, performed by the driver, to a steering mechanism (not shown). The steering column 83 is a tubular member. The steering column 83 covers the outer periphery of the steering shaft 82. The steering support 1 is configured, in particular, to support the steering column 83 of the steering 8.

The steering support 1 is fixed to a vehicle body.

The front end portion of the steering support 1 is fixed to a front portion of the vehicle body on a driver's seat side.

The left end portion of the steering support 1 is fixed to a pillar on the driver's seat side via the bracket 91. The pillar is a part of the vehicle body.

The right end portion of the steering support 1 is fixed to a pillar on a passenger's seat side via a steering member 92 and a bracket 93. The steering member 92 is a tubular member. The steering member 92 is arranged to extend in the left-right direction. The steering member 92 connects the right end portion of the steering support 1 and the bracket 93.

The lower surface of the steering support 1 is fixed to a floor-forming portion of the vehicle body via a floor brace 94. The floor brace 94 is a rod-shaped member. The floor brace 94 is arranged to extend upward from the vehicle body toward the steering support 1.

Figure 2:
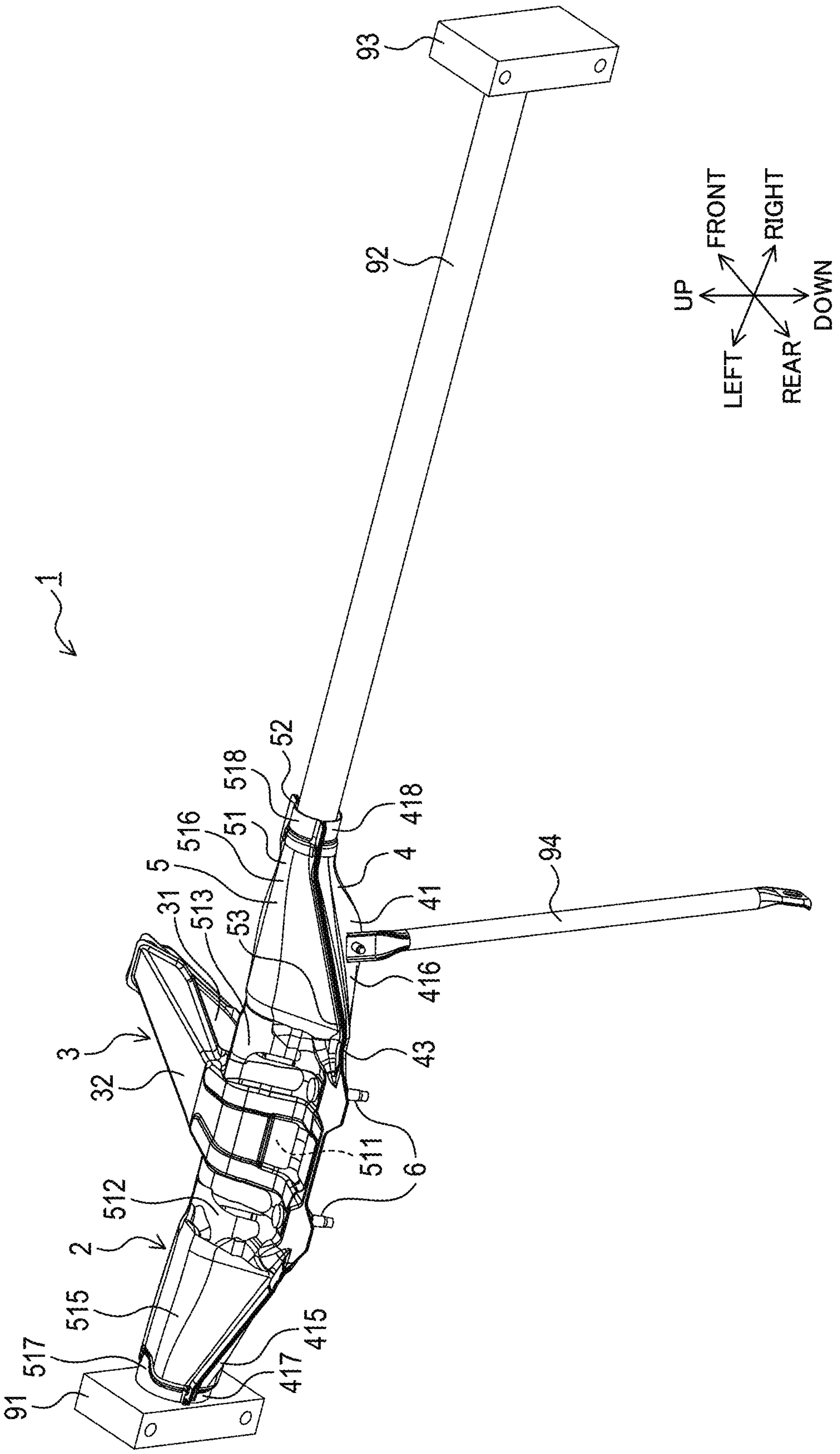
FIG. 2 is a perspective view of the steering support of the first embodiment as seen from the rear.

As shown in FIG. 2, the steering support 1 includes a main portion 2 and a connecting portion 3.

Figure 3:
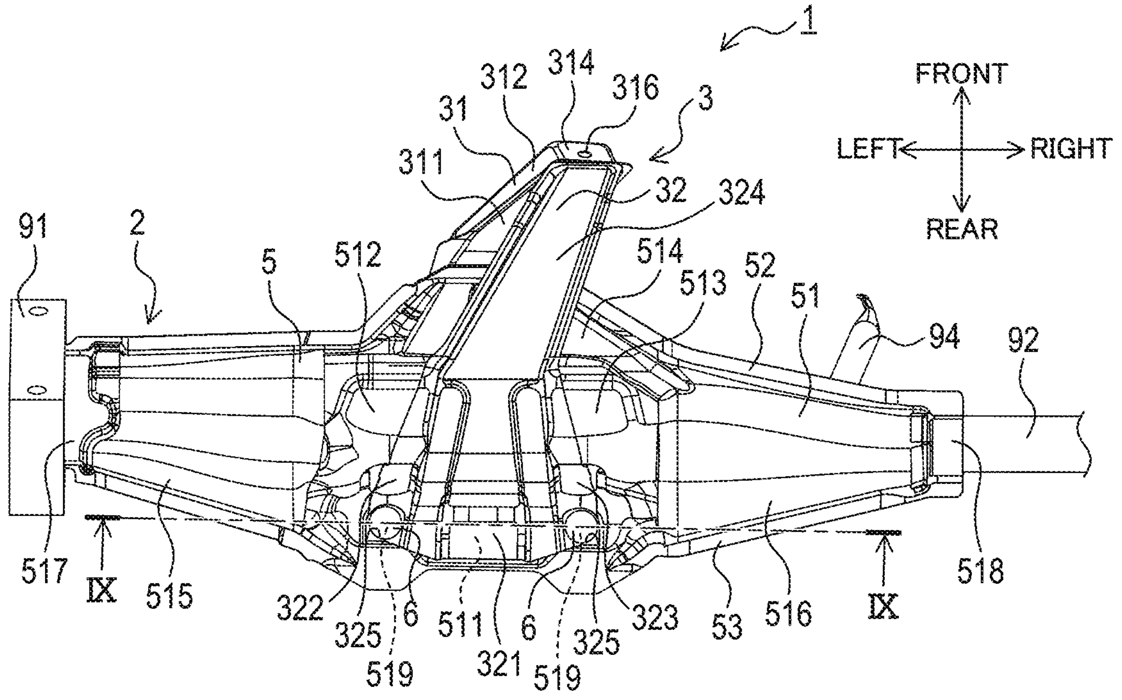
FIG. 3 is a top view of the steering support of the first embodiment.

As shown in FIG. 3, the main portion 2 has a substantially trapezoidal shape in a top view. The total dimension of the main portion 2 in the left-right direction is larger than the total dimension in the front-rear direction. The dimension of the main portion 2 in the front-rear direction gradually decreases from a center of the main portion 2 in the left-right direction toward the left end and the right end of the main portion 2.

Figure 6:
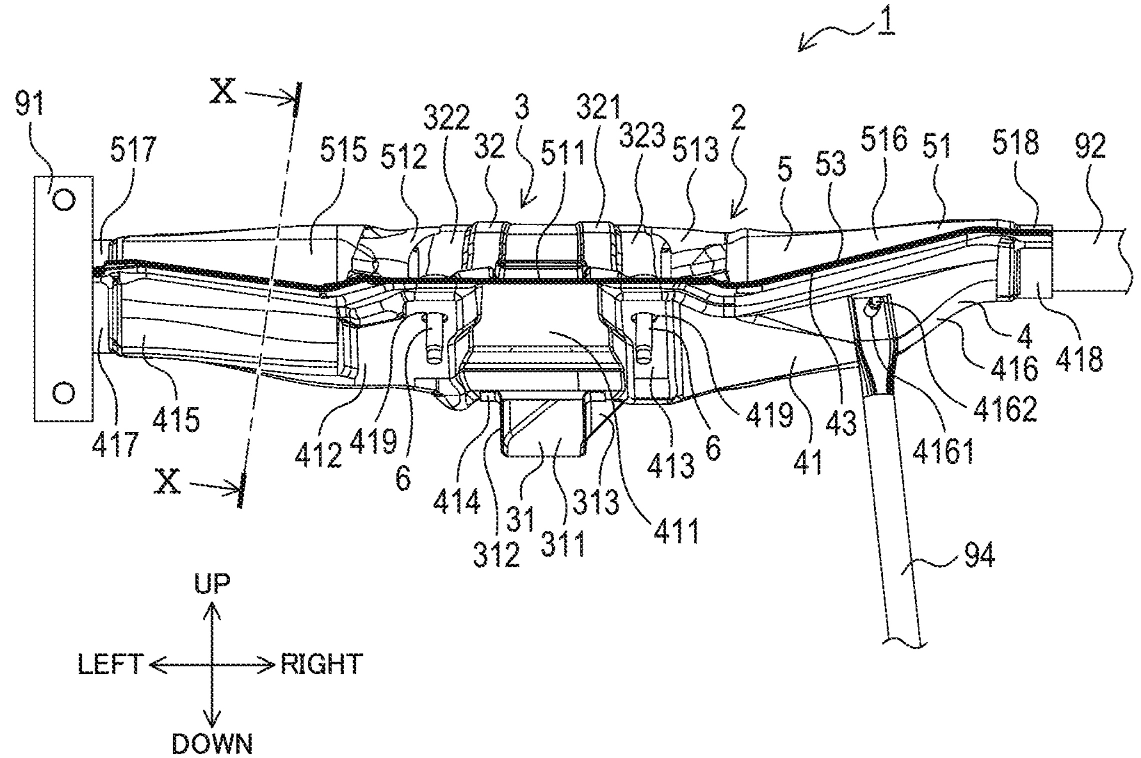
FIG. 6 is a rear view of the steering support of the first embodiment.
Figure 10:
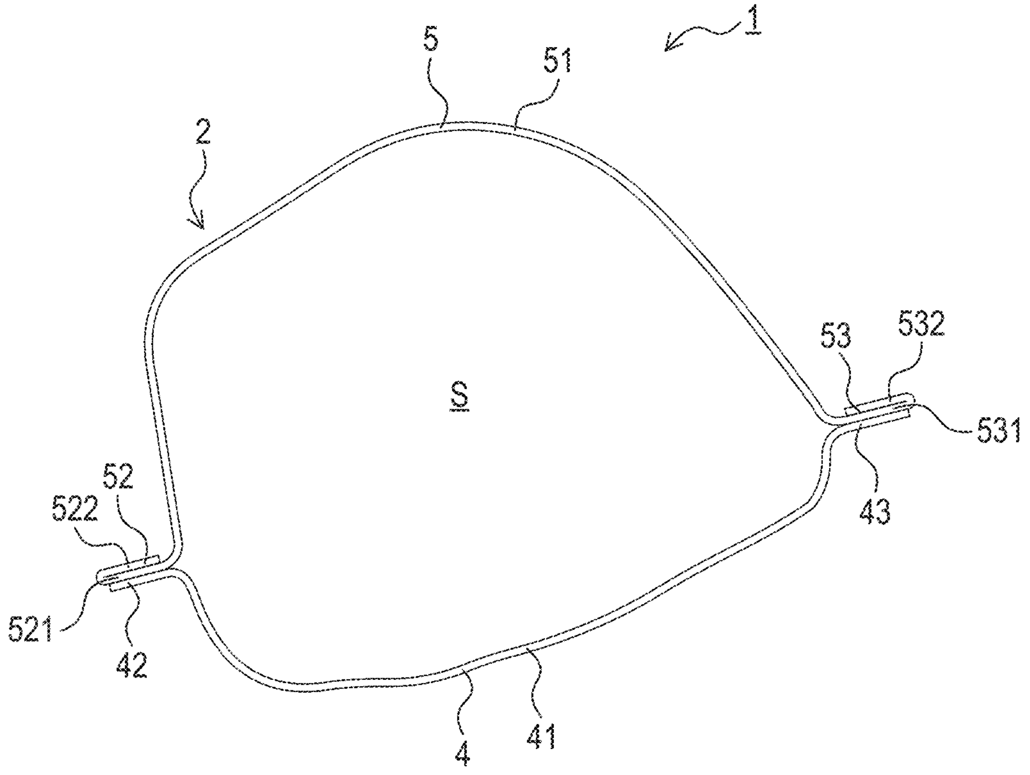
FIG. 10 is a cross-sectional view taken along line X-X in FIG. 6.

As shown in FIG. 6, the main body 2 includes a lower member 4 and an upper member 5. The lower member 4 and the upper member 5 include metal plates. The upper member 5 includes a plate member having a plate thickness smaller than that of the lower member 4. The lower member 4 and the upper member 5 are arranged to face each other in the up-down direction. As shown in FIG. 10, an internal space S is formed between the lower member 4 and the upper member 5. The lower member 4 and the upper member 5 are welded to each other.

Figure 4:
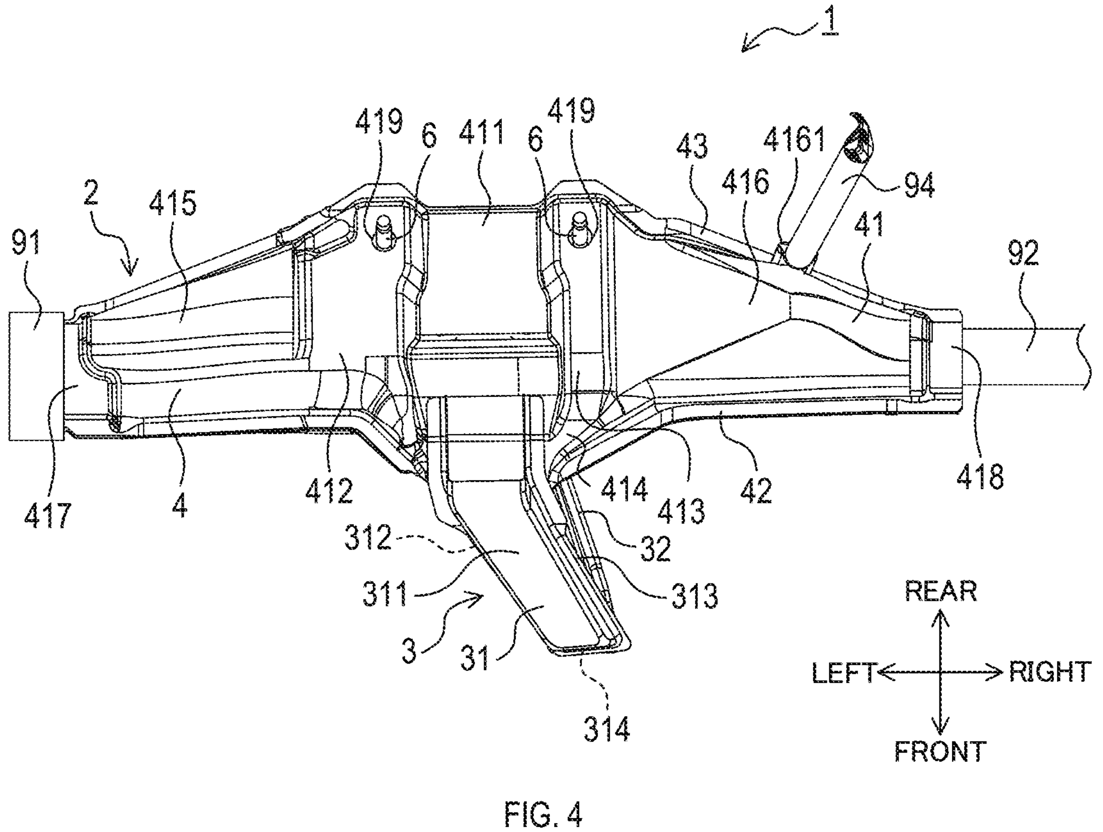
FIG. 4 is a bottom view of the steering support of the first embodiment.

The lower member 4 is arranged below the upper member 5. As shown in FIG. 4, the lower member 4 includes a lower main body 41, a front lower flange 42, and a rear lower flange 43.

The lower main body 41 extends from the left end to the right end of the lower member 4. As shown in FIG. 6, the lower main body 41, as a whole, is curved downward in a convex shape. The lower main body 41 includes a central portion 411, a left fastening portion 412, a right fastening portion 413, a front portion 414, a left side portion 415, a right side portion 416, a left end portion 417, and a right end portion 418.

Figure 5:
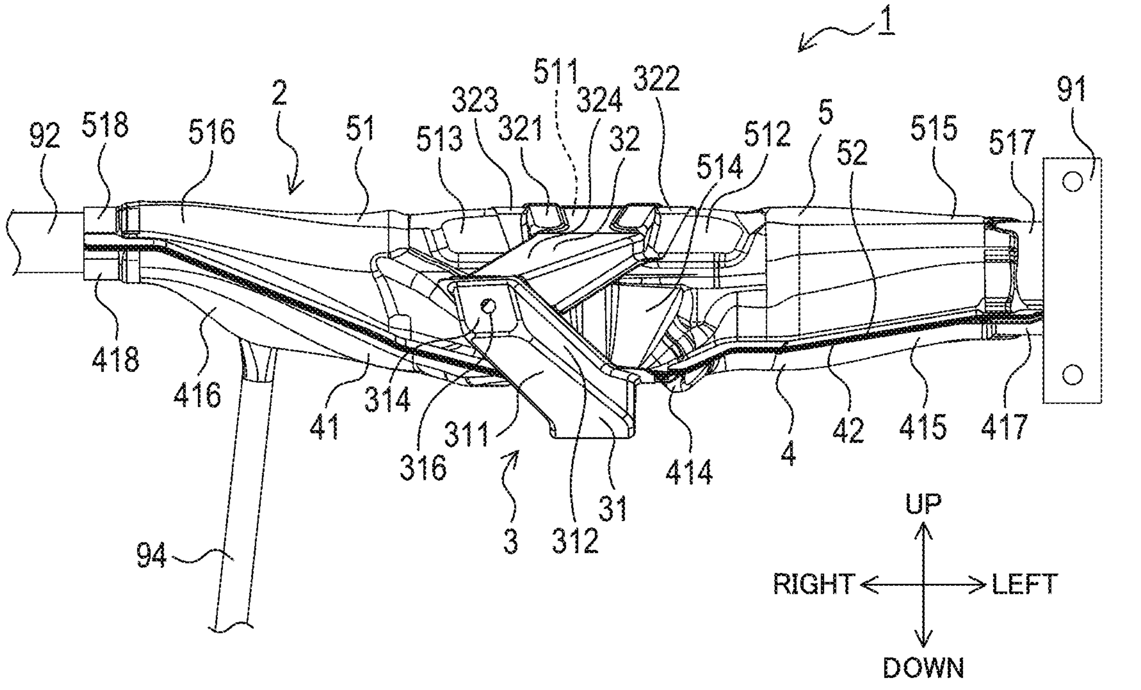
FIG. 5 is a front view of the steering support of the first embodiment.
Figure 9:
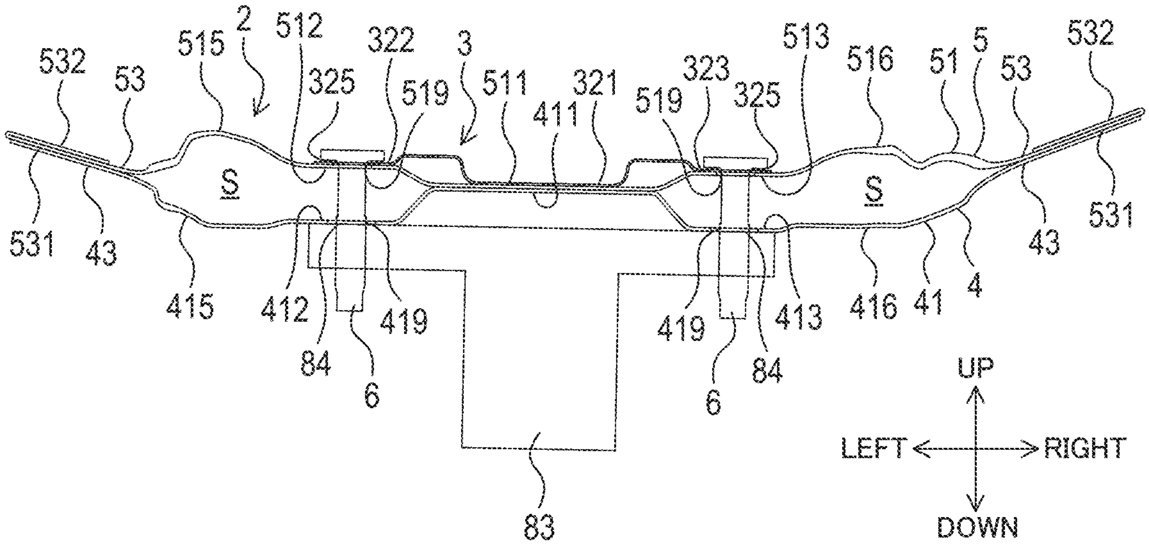
FIG. 9 is a cross-sectional view taken along line IX-IX in FIG. 3.

As shown in FIG. 4, the central portion 411 is a portion that extends at the center in the left-right direction of the lower main body 41. The central portion 411 is in the form of a flat plate. The central portion 411 has a substantially rectangular shape in a bottom view. The central portion 411 is surrounded on three sides, front, left, and right by the front portion 414, the left fastening portion 412, and the right fastening portion 413, respectively. As shown in FIGS. 5 and 9, the central portion 411 is positioned above the front portion 414, the left fastening portion 412, and the right fastening portion 413.

As shown in FIG. 4, the left fastening portion 412 is a portion continuous with the left side of the central portion 411. The right fastening portion 413 is a portion continuous with the right side of the central portion 411. The central portion 411 is sandwiched between the left fastening portion 412 and the right fastening portion 413. The left fastening portion 412 and the right fastening portion 413 have a substantially rectangular shape in a bottom view. As shown in FIG. 6, the left fastening portion 412 and the right fastening portion 413 bulge downward relative to the central portion 411. Each of the left fastening portion 412 and the right fastening portion 413 includes a through hole 419 formed therein.

As shown in FIG. 4, the front portion 414 is a portion continuous with the front sides of the central portion 411, the left fastening portion 412, and the right fastening portion 413. The front portion 414 has a substantially trapezoidal shape in a bottom view. As shown in FIG. 6, the front portion 414 bulges downward relative to the central portion 411. The front portion 414 is fixed to a left side wall 312 and a right side wall 313 of the connecting portion 3 as described below.

As shown in FIG. 4, the left side portion 415 is a portion continuous with the left side of the left fastening portion 412. The right side portion 416 is a portion continuous with the right side of the right fastening portion 413. The left side portion 415 and the right side portion 416 have a substantially rectangular shape in a bottom view. As shown in FIG. 6, the left side portion 415 and the right side portion 416 bulge downward. As shown in FIG. 4, the dimensions of the left side portion 415 and the right side portion 416 in the front-rear direction decrease with distance from the left fastening portion 412 and the right fastening portion 413.

As shown in FIG. 6, the floor brace 94 is arranged below the right side portion 416. The right side portion 416 includes a through hole 4161 formed therein. A fastening member 4162 is inserted through the through hole 4161. The right side portion 416 and the floor brace 94 are fastened to each other by the fastening member 4162.

Figure 7:
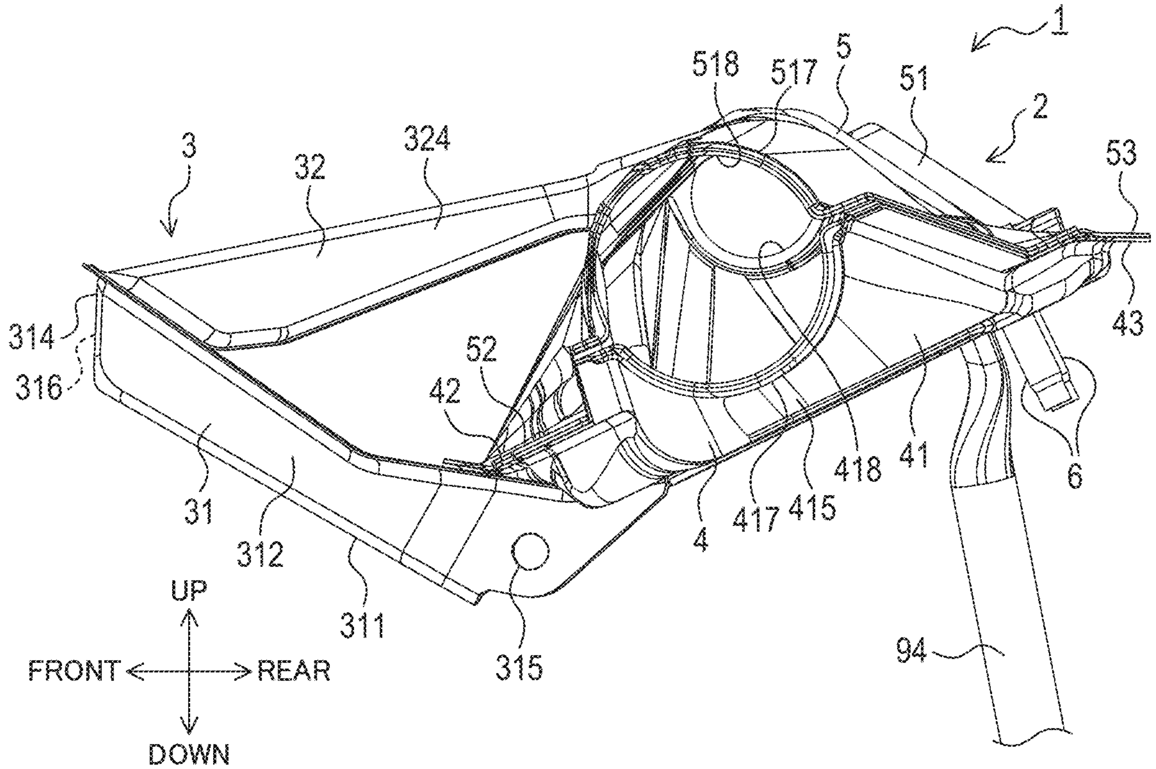
FIG. 7 is a left side view of the steering support of the first embodiment.
Figure 8:
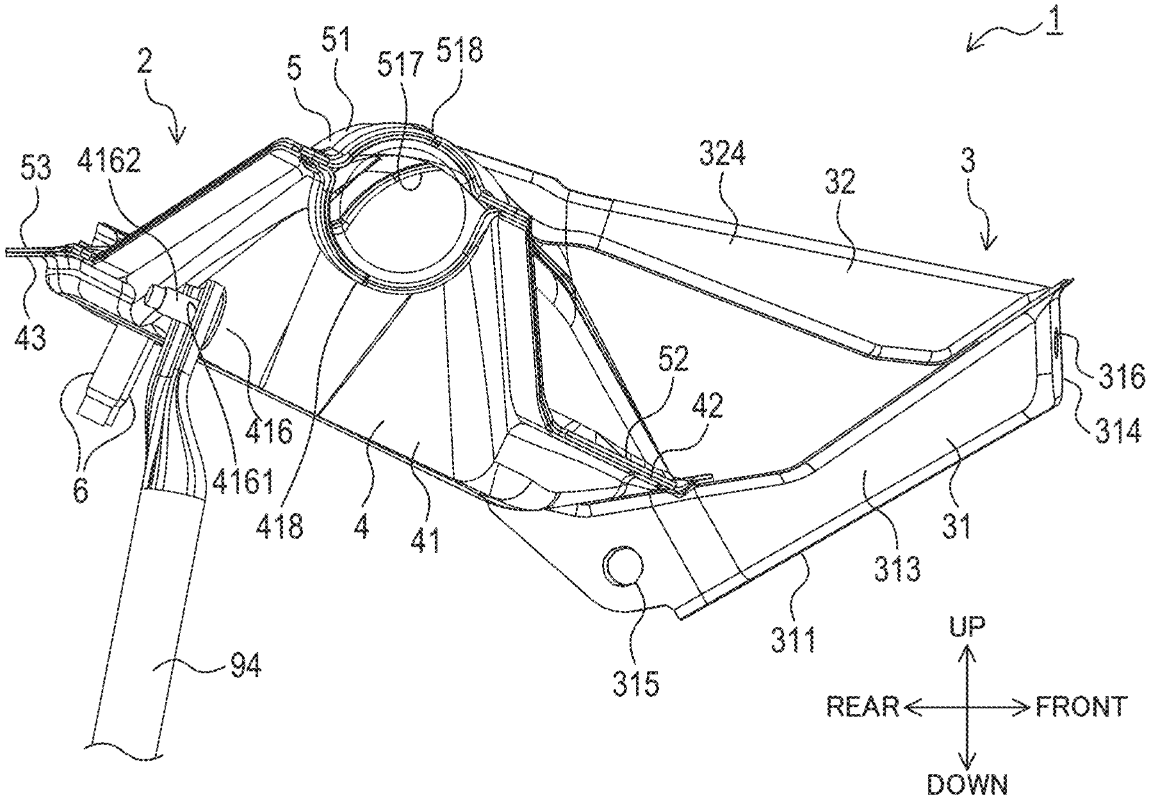
FIG. 8 is a right side view of the steering support of the first embodiment.

As shown in FIG. 4, the left end portion 417 is a portion continuous with the left side of the left side portion 415. The left end portion 417 constitutes the left end of the lower main body 41. The right end portion 418 is a portion continuous with the right side of the right side portion 416. The right end portion 418 constitutes the right end of the lower main body 41. As shown in FIGS. 7 and 8, the left end portion 417 and the right end portion 418 bulge downward. The left end portion 417 and the right end portion 418 are curved in a substantially semicylindrical shape so as to bulge downward.

As shown in FIG. 4, the front lower flange 42 extends forward from a front edge of the lower main body 41. The front lower flange 42 extends from the entire front edge of the lower main body 41. The front lower flange 42 is continuously provided from the left end to the right end of the lower main body 41. As shown in FIG. 5, the front lower flange 42 has a shape in which multiple flat plate-like portions are connected along the edge of the lower main body 41. The front lower flange 42, as a whole, is inclined upward from the center in the left-right direction toward the left end and the right end.

As shown in FIG. 4, the rear lower flange 43 extends rearward from the rear edge of the lower main body 41. The rear lower flange 43 extends from the entire rear edge of the lower main body 41. The rear lower flange 43 is continuously provided from the left end to the right end of the lower main body 41. As shown in FIG. 6, the rear lower flange 43 has a shape in which multiple flat plate-like portions are connected along the edge of the lower main body 41. The rear lower flange 43, as a whole, is inclined upward from the center in the left-right direction toward the left end and the right end.

The upper member 5 is arranged above the lower member 4. As shown in FIG. 3, the upper member 5 includes an upper main body 51, a front upper flange 52, and a rear upper flange 53.

The upper main body 51 extends from the left end to the right end of the upper member 5. As shown in FIG. 6, the upper main body 51, as a whole, is curved upward in a convex shape. As shown in FIG. 3, the upper main body 51 includes a central portion 511, a left fastening portion 512, a right fastening portion 513, a front portion 514, a left side portion 515, a right side portion 516, a left end portion 517, and a right end portion 518.

The central portion 511 is a portion that extends at the center in the left-right direction of the upper main body 51. As shown in FIG. 3, the central portion 511 is surrounded on three sides, front, left, and right by the front portion 514, the left fastening portion 512, and the right fastening portion 513, respectively. As shown in FIG. 9, the central portion 511 is in the form of a flat plate. The central portion 511 is located below the left fastening portion 512 and the right fastening portion 513.

As shown in FIG. 3, the left fastening portion 512 is a portion continuous with the left side of the central portion 511. The right fastening portion 513 is a portion continuous with the right side of the central portion 511. The central portion 511 is sandwiched between the left fastening portion 512 and the right fastening portion 513. The left fastening portion 512 and the right fastening portion 513 have a substantially rectangular shape in a top view. As shown in FIG. 9, the left fastening portion 512 and the right fastening portion 513 bulge upward relative to the central portion 511. Each of the left fastening portion 512 and the right fastening portion 513 includes a through hole 519 formed therein.

As shown in FIG. 3, the front portion 514 is a portion continuous with the front sides of the central portion 511, the left fastening portion 512, and the right fastening portion 513. As shown in FIG. 5, the front portion 514 is located below the left fastening portion 512 and the right fastening portion 513.

As shown in FIG. 3, the left side portion 515 is a portion continuous with the left side of the left fastening portion 512. The right side portion 516 is a portion continuous with the right side of the right fastening portion 513. The left side portion 515 and the right side portion 516 have a substantially rectangular shape in a top view. As shown in FIG. 5, the left side portion 515 and the right side portion 516 bulge upward. As shown in FIG. 3, the dimensions of the left side portion 515 and the right side portion 516 in the front-rear direction decrease with distance from the left fastening portion 512 and the right fastening portion 513.

The left end portion 517 is a portion continuous with the left side of the left side portion 515. The left end portion 517 constitutes the left end of the upper main body 51. The right end portion 518 is a portion continuous with the right side of the right side portion 516. The right end portion 518 constitutes the right end of the upper main body 51. As shown in FIGS. 7 and 8, the left end portion 517 and the right end portion 518 bulge upward. The left end portion 517 and the right end portion 518 are curved in a substantially semicylindrical shape so as to bulge upward.

As shown in FIG. 3, the front upper flange 52 extends forward from a front edge of the upper main body 51. The front upper flange 52 extends from the entire front edge of the upper main body 51. The front upper flange 52 is continuously provided from the left end to the right end of the upper main body 51. As shown in FIG. 5, the front upper flange 52 has a shape in which multiple flat plate-like portions are connected along the edge of the upper main body 51. The front upper flange 52, as a whole, is inclined upward from the center in the left-right direction toward the left end and the right end. The front upper flange 52 will be described in more detail below.

As shown in FIG. 3, the rear upper flange 53 extends rearward from a rear edge of the upper main body 51. The rear upper flange 53 extends from the entire rear edge of the upper main body 51. The rear upper flange 53 is continuously provided from the left end to the right end of the upper main body 51. As shown in FIG. 6, the rear upper flange 53 has a shape in which multiple flat plate-like portions are connected along the edge of the upper main body 51. The rear upper flange 53, as a whole, is inclined upward from the center in the left-right direction toward the left end and the right end. The rear upper flange 53 will be described in more detail below.

As described above, the lower member 4 and the upper member 5 are arranged to face each other in the up-down direction. The lower member 4 and the upper member 5 are arranged so that the lower main body 41 faces the upper main body 51, the front lower flange 42 faces the front upper flange 52, and the rear lower flange 43 faces the rear upper flange 53 in the up-down direction.

In the lower main body 41 and the upper main body 51, the central portion 411 faces the central portion 511, the left fastening portion 412 faces the left fastening portion 512, the right fastening portion 413 faces the right fastening portion 513, the front portion 414 faces the front portion 514, the left side portion 415 faces the left side portion 515, the right side portion 416 faces the right side portion 516, the left end portion 417 faces the left end portion 517, and the right end portion 418 faces the right end portion 518. As shown in FIG. 9, the central portions 411 and 511 of the lower member 4 and the upper member 5 are in contact with each other. In the lower member 4 and the upper member 5, the left fastening portion 412 is spaced from the left fastening portion 512, the right fastening portion 413 is spaced from the right fastening portion 513, the front portion 414 is spaced from the front portion 514, the left side portion 415 is spaced from the left side portion 515, the right side portion 416 is spaced from the right side portion 516, the left end portion 417 is spaced from the left end portion 517, and the right end portion 418 is spaced from the right end portion 518.

As shown in FIGS. 5 and 7, the left end portion 417 of the lower main body 41, together with the left end portion 517 of the upper main body 51, constitutes a left end portion of the main portion 2 (and thus, a left end portion of the steering support 1). The left end portion of the main portion 2 is cylindrical. The left end portion of the main portion 2 is inserted into an opening formed in the bracket 91. The outer circumferential surface of the left end portion of the main portion 2 is, for example, welded to the bracket 91 over its entire circumference.

As shown in FIGS. 5 and 8, the right end portion 418 of the lower main body 41, together with the right end portion 518 of the upper main body 51, constitutes a right end portion of the main portion 2 (and thus, a right end portion of the steering support 1). The right end portion of the main portion 2 is cylindrical. The steering member 92 is inserted into the right end portion of the main portion 2. The inner circumferential surface of the right end portion of the main portion 2 is, for example, welded to the steering member 92 over its entire circumference.

As shown in FIG. 9, a central portion 321, a left fastening portion 322, and a right fastening portion 323 of a connecting portion 3 described below are arranged above the central portion 511, the left fastening portion 512, and the right fastening portion 513 of the upper main body 51. Each of the left fastening portion 322 and the right fastening portion 323 of the connecting portion 3 has a through hole 325 formed at a position facing the through hole 519 of the upper main body 51. A steering column 83 is arranged below the central portion 411, the left fastening portion 412, and the right fastening portion 413 of the lower main body 41. The steering column 83 includes through holes 84 formed at positions facing the through holes 419 of the lower main body 41. Fastening members 6 such as bolts are inserted into the through holes 325 of the connecting portion 3, the through holes 419 of the lower main body 41, the through holes 519 of the upper main body 51, and the through holes 84 of the steering column 83. The fastening members 6 fasten the steering column 83 through the left fastening portions 322, 412, and 512, and through the right fastening portions 323, 413, and 513, which are provided to the connecting portion 3, the lower main body 41, and the upper main body 51.

As shown in FIG. 5, the front lower flange 42 and the front upper flange 52 are in surface contact with each other. The front lower flange 42 and the front upper flange 52 are welded to each other. As shown in FIG. 6, the rear lower flange 43 and the rear upper flange 53 are in surface contact with each other. The rear lower flange 43 and the rear upper flange 53 are welded to each other. As shown in FIG. 9, the internal spaces S are defined by the left fastening portion 412, the right fastening portion 413, the front portion 414, the left side portion 415, and the right side portion 416 of the lower member 4, and the left fastening portion 512, the right fastening portion 513, the front portion 514, the left side portion 515, and the right side portion 516 of the upper member 5.

An external force applied to the main portion 2 from the steering column 83 is easily transmitted through the front lower flange 42 and the front upper flange 52 which are welded together, and through the rear lower flange 43 and the rear upper flange 53 which are also welded together. The external force transmitted through these flange portions 42, 43, 52, and 53 is dispersed through the left and right end portions of the main portion 2 and the connecting portion 3 to the vehicle body.

The upper member 5 includes a plate member having a plate thickness smaller than that of the lower member 4, as described above. Therefore, the plate thickness of the plate member included in the front upper flange 52 is smaller than the plate thickness of the plate member included in the front lower flange 42. The plate thickness of the plate member included in the rear upper flange 53 is smaller than the plate thickness of the plate member included in the rear lower flange 43. From the viewpoint of the rigidity of the main portion 2, and thus of the steering support 1, the front upper flange 52 and the rear upper flange 53 of the steering support 1 include elongated portions 521 and 531 and folded portions 522 and 532 as shown in FIG. 10.

Figure 11:
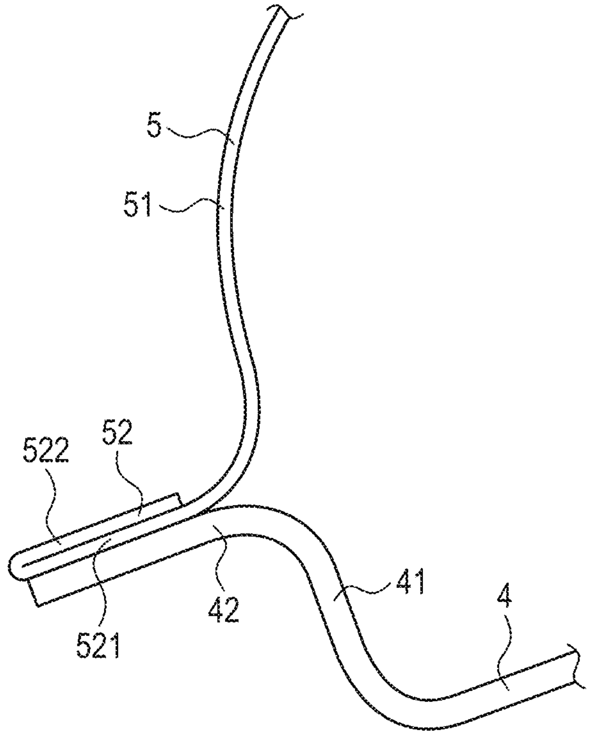
FIG. 11 is a schematic cross-sectional view of a front lower flange and a front upper flange of the first embodiment.

As shown in FIG. 11, the front upper flange 52 includes the elongated portion 521 and the folded portion 522.

The elongated portion 521 is a portion extending from the upper main body 51. The elongated portion 521 is a portion extending forward from the entire front edge of the upper main body 51.

The folded portion 522 is a portion formed by folding back a first end portion of the elongated portion 521, the first end portion being opposite a second end portion of the elongated portion 521, the second end portion being directly connected to the upper main body 51. The folded portion 522 is in surface contact with at least one of the elongated portion 521 or the front lower flange 42. The folded portion 522 is welded to the elongated portion 521 and the front lower flange 42. The welding of the folded portion 522 to the elongated portion 521 and the front lower flange 42 means that the elongated portion 521, the folded portion 522, and the front lower flange 42 are welded by lap welding. The order of the elongated portion 521, the folded portion 522 and the front lower flange 42 in a plate thickness direction may be different.

The folded portion 522 is, for example, folded back upward. The folded portion 522 is folded back in a direction way from the front lower flange 42. The folded portion 522 is in surface contact with the elongated portion 521. The entire area of the folded portion 522 is in surface contact with the elongated portion 521. In this case, the folded portion 522 preferably has a dimension of 9 mm or more from an edge directly connected to the elongated portion 521 to an edge opposite the edge directly connected to the elongated portion 521.

The elongated portion 521 includes a first surface and a second surface, and the first surface is in surface contact with the folded portion 522 and the second surface is in surface contact with the front lower flange 42. Both surfaces of the elongated portion 521 are in surface contact with the front lower flange 42 and the folded portion 522. In a state where the elongated portion 521 is in surface contact with both the front lower flange 42 and the folded portion 522, the elongated portion 521, the folded portion 522, and the front lower flange 42 are welded to each other. The elongated portion 521, the folded portion 522, and the rear lower flange 43 are welded to each other, for example, by laser welding.

A total plate thickness of the front upper flange 52 is greater than a plate thickness of the upper main body 51. The total plate thickness of the front upper flange 52 is the sum of the dimensions of the front upper flange 52 in the plate thickness direction in a region where the front upper flange 52 is in surface contact with the front lower flange 42. The front upper flange 52 includes the elongated portion 521 and the folded portion 522. Thus, in other words, the total plate thickness of the front upper flange 52 is the sum of a plate thickness of the elongated portion 521 and a plate thickness of the folded portion 522. A ratio of the total plate thickness of the front upper flange 52 to a plate thickness of the front lower flange 42 is preferably 0.5 or more and 2.0 or less.

As shown in FIG. 10, the rear upper flange 53 includes an elongated portion 531 and a folded portion 532.

The elongated portion 531 is a portion extending from the upper main body 51. The elongated portion 531 is a portion extending rearward from the entire rear edge of the upper main body 51.

The folded portion 532 is a portion formed by folding back a first end portion of the elongated portion 531, the first end portion being opposite a second end portion of the elongated portion 531, the second end portion being directly connected to the upper main body 51. The folded portion 532 is in surface contact with at least one of the elongated portion 531 or the rear lower flange 43. The folded portion 532 is welded to the elongated portion 531 and the rear lower flange 43. The welding of the folded portion 532 to the elongated portion 531 and the rear lower flange 43 means that the elongated portion 531, the folded portion 532, and the rear lower flange 43 are welded together by lap welding. The order of the elongated portion 531, the folded portion 532 and the rear lower flange 43 in the plate thickness direction may be different.

The folded portion 532 is, for example, folded back upward. The folded portion 532 is folded back in a direction away from the rear lower flange 43. The folded portion 532 is in surface contact with the elongated portion 531. The entire area of the folded portion 532 is in surface contact with the elongated portion 531. In this case, the folded portion 532 preferably has a dimension of 9 mm or more from an end edge directly connected to the elongated portion 531 to an end edge opposite the end edge directly connected to the elongated portion 531.

The elongated portion 531 includes a first surface and a second surface, and the first surface is in surface contact with the folded portion 532 and the second surface is in surface contact with the rear lower flange 43. Both surfaces of the elongated portion 531 are in surface contact with the rear lower flange 43 and the folded portion 532. In a state where the elongated portion 531 is in surface contact with both the rear lower flange 43 and the folded portion 532, the elongated portion 531, the folded portion 532, and the rear lower flange 43 are welded to each other. The elongated portion 531, the folded portion 532, and the rear lower flange 43 are welded to each other, for example, by laser welding.

A total plate thickness of the rear upper flange 53 is greater than the plate thickness of the upper main body 51. The total plate thickness of the rear upper flange 53 is the sum of the dimensions of the rear upper flange 53 in the plate thickness direction in a region where the rear upper flange 53 is in surface contact with the rear lower flange 43. The rear upper flange 53 includes the elongated portion 531 and the folded portion 532. Thus, in other words, the total plate thickness of the rear upper flange 53 is the sum of a plate thickness of the elongated portion 531 and a plate thickness of the folded portion 532. A ratio of the total plate thickness of the rear upper flange 53 to a plate thickness of the rear lower flange 43 is preferably 0.5 or more and 2.0 or less.

As shown in FIG. 2, the connecting portion 3 is arranged so as to extend forward from the center of the main portion 2 in the left-right direction toward the front side of the main portion 2. As shown in FIG. 7, the connecting portion 3 has a substantially V-shape in a side view. The connecting portion 3 includes a lower connecting portion 31 and an upper connecting portion 32.

As shown in FIG. 4, the lower connecting portion 31 is a portion extending forward from a position facing the front portion 414 of the lower member 4 from below. The lower connecting portion 31 extends forward beyond the front end of the main portion 2. The lower connecting portion 31 has a substantially C-shape with an open top in a cross-section perpendicular to its extending direction. The lower connecting portion 31 includes a bottom wall 311, the left side wall 312, the right side wall 313, and a tip wall 314.

The bottom wall 311 is a plate-like portion that constitutes a bottom surface of the lower connecting portion 31. As shown in FIG. 7, the bottom wall 311 is inclined so that its front side is positioned higher.

The left side wall 312 is a plate-like portion that constitutes a left side surface of the lower connecting portion 31. The left side wall 312 extends upward from the left edge of the bottom wall 311.

As shown in FIG. 8, the right side wall 313 is a plate-like portion that constitutes a right side surface of the lower connecting portion 31. The right side wall 313 extends upward from the right edge of the bottom wall 311. The right side wall 313 faces the left side wall 312 with a space therebetween. As shown in FIGS. 7 and 8, each of the left side wall 312 and the right side wall 313 includes a through hole 315 at an end portion close to the lower member 4.

As shown in FIG. 5, the tip wall 314 is a plate-like portion connecting the front edges of the bottom wall 311, the left side wall 312, and the right side wall 313. The tip wall 314 includes a through hole 316 formed therein.

As shown in FIG. 3, the upper connecting portion 32 is a portion extending forward from a position facing the through hole 519 of the upper member 5 from above. The upper connecting portion 32 extends forward beyond the front end of the main portion 2. The upper connecting portion 32 includes a central portion 321, a left fastening portion 322, a right fastening portion 323, and an extended portion 324.

The central portion 321 is a portion arranged above the central portion 511 of the upper member 5. The central portion 321 has a substantially trapezoidal shape in a top view. As shown in FIG. 9, a rear part of the central portion 321 is formed in a flat plate shape. The rear part of the central portion 321 is in contact with the central portion 511 from above. As shown in FIG. 3, the central portion 321 is surrounded on three sides, front, left, and right by the extended portion 324, the left fastening portion 322, and the right fastening portion 323, respectively.

The left fastening portion 322 is a portion continuous with the left side of the central portion 321. The right fastening portion 323 is a portion continuous with the right side of the central portion 321. The central portion 321 is sandwiched between the left fastening portion 322 and the right fastening portion 323. The left fastening portion 322 and the right fastening portion 323 have a substantially rectangular shape in a top view. Each of the left fastening portion 322 and the right fastening portion 323 includes a through hole 325 formed therein. As shown in FIG. 9, the fastening members 6 are inserted through the through holes 325. As described above, the fastening members 6 fasten the left fastening portion 322 and the right fastening portion 323 to the lower main body 41, the upper main body 51, and the steering column 83.

As shown in FIG. 3, the extended portion 324 is a portion extending forward from the front side of the central portion 321. The extended portion 324 extends forward beyond the front end of the main portion 2. The extended portion 324 extends above the lower connecting portion 31. The extended portion 324 has a substantially C-shape with an open bottom in a cross-section perpendicular to its extending direction. As shown in FIG. 7, the front end portion of the extended portion 324 is fixed to the front end portion of the lower connecting portion 31, for example, by welding.

Although not shown, the connecting portion 3 is fastened to the steering column 83 by inserting a fastening member through the through hole 315. The connecting portion 3 is fastened to the vehicle body by inserting a fastening member through the through hole 316.

[1-2. Effects]

According to the first embodiment described in detail above, the following effects can be obtained.

(1a) From the viewpoint of carbon neutrality, it is desirable to reduce the weight of the steering support. On the other hand, from the viewpoint of vehicle collision safety performance, the steering support is required to have high rigidity.

In the steering support 1, the upper member 5 includes a plate member having a plate thickness smaller than that of the lower member 4. With this configuration, weight reduction can be achieved while maintaining rigidity. This is because the steering support 1 is a member that supports the steering 8 from above, and the external force input from the steering 8 tends to be larger on the lower member 4 than on the upper member 5. The inclusion of a relatively thick plate member in the lower member 4 makes it possible to maintain the overall rigidity of the steering support 1. The inclusion of a relatively thin plate member in the upper member 5 makes it possible to achieve weight reduction of the steering support 1.

(1b) The external force input from the steering 8 to the steering support 1 is easily transmitted to the front lower flange 42 and the front upper flange 52, and to the rear lower flange 43 and the rear upper flange 53. Therefore, in the steering support 1, the front upper flange 52 and the rear upper flange 53 include the elongated portions 521 and 531 and the folded portions 522 and 532.

With this configuration, the total plate thickness of the front upper flange 52 and the total plate thickness of the rear upper flange 53 can be increased. Therefore, it is possible to more easily maintain the rigidity of the steering support 1.

(1c) In the front upper flange 52 and the rear upper flange 53, the folded portion 522 is in surface contact with at least the elongated portion 521 and the folded portion 532 is in surface contact with at least the elongated portion 531. The ratio of the total plate thickness of the front upper flange 52 to the plate thickness of the front lower flange 42 is, for example, 0.5 or more and 2.0 or less. The ratio of the total plate thickness of the rear upper flange 53 to the plate thickness of the rear lower flange 43 is, for example, 0.5 or more and 2.0 or less.

With this configuration, when the front lower flange 42 and the front upper flange 52 are welded to each other, and the rear lower flange 43 and the rear upper flange 53 are welded to each other, it is easier to satisfy the plate thickness ratio that is one of the welding conditions. Therefore, it is easier to weld the front lower flange 42 and the front upper flange 52 to each other and to weld the rear lower flange 43 and the rear upper flange 53 to each other. As a result, the rigidity of these flange portions 42, 43, 52, and 53 can be enhanced. Consequently, the overall rigidity of the steering support 1 can be more easily maintained. It is also possible to improve the productivity of the steering support 1.

(1d) In each of the front upper flange 52 and the rear upper flange 53, the dimension of the folded portion 522, 532, from the end edge directly connected to the elongated portion 521, 531 to the end edge opposite the end edge directly connected to the elongated portion 521, 531 is, for example, 9 mm or more. With this configuration, it is easy to weld the folded portions 522 and 532 to the elongated portions 521 and 531 and the lower flange portions 42 and 43. As a result, the rigidity of the flange portions 42, 43, 52, and 53 can be enhanced. Consequently, the overall rigidity of the steering support 1 can be more easily maintained. It is also possible to improve the productivity of the steering support 1.

2. Second Embodiment

[2-1. Configuration]

The second embodiment has a basic configuration similar to that of the first embodiment, and therefore, the differences will be described below. A reference numeral identical to that in the first embodiment indicates the same configuration and refers to the preceding description.

Figure 12:
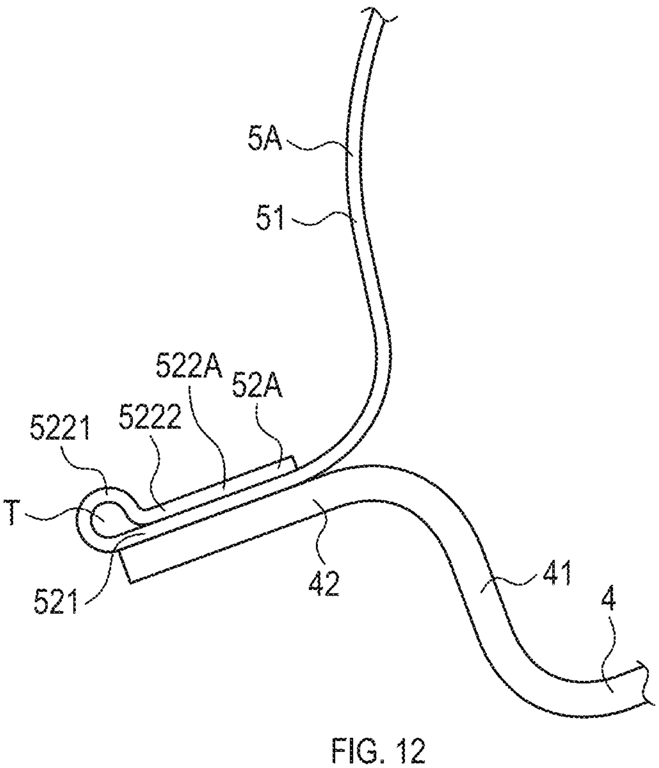
FIG. 12 is a schematic cross-sectional view of a front lower flange and a front upper flange of a second embodiment.

The steering support of the second embodiment shown in FIG. 12 includes an upper member 5A instead of the aforementioned upper member 5. The upper member 5A includes a front upper flange 52A and a rear upper flange (not shown) instead of the aforementioned front upper flange 52 and the rear upper flange 53. The front upper flange 52A and the rear upper flange have substantially similar configurations, and thus, the following will describe the front upper flange 52A in detail, and the description of the rear upper flange will be omitted.

The front upper flange 52A includes a folded portion 522A instead of the aforementioned folded portion 522. The folded portion 522A is formed by folding back the first end portion of the elongated portion 521, the first end portion being opposite the second end portion of the elongated portion 521, the second end portion being directly connected to the upper main body 51, as in the case of the aforementioned folded portion 522. However, the folded portion 522A includes a spacer portion 5221 and a contact portion 5222.

The spacer portion 5221 is a portion formed by folding back the elongated portion 521 so as to form a space T between the spacer portion 5221 and the elongated portion 521. The spacer portion 5221 is formed by folding back in a direction away from the lower member 4 (more specifically, a front lower flange 42).

The contact portion 5222 is a portion extending from a first end portion of the spacer portion 5221, the first end portion being opposite a second end portion of the spacer portion 5221, the second end portion being directly connected to the elongated portion 521. The contact portion 5222 is in surface contact with at least the elongated portion 521 among the elongated portion 521 and the front lower flange 42. Since the spacer portion 5221 is formed by folding back in the direction away from the lower member 4, the contact portion 5222 is in surface contact with the elongated portion 521.

[2-2. Effects]

According to the second embodiment described in detail above, in addition to the effects similar to those described in the first embodiment, the following effects can be obtained.

(2a) In the front upper flange 52A, the folded portion 522A includes the spacer portion 5221 and the contact portion 5222. The spacer portion 5221 is formed by folding back the elongated portion 521 so as to form a space T between the spacer portion 5221 and the elongated portion 521. With this configuration, the formation of the space T between the spacer portion 5221 and the elongated portion 521 can increase the rigidity of the front upper flange 52A compared to a case where the entire folded portion is in surface contact with the elongated portion 521. Since the rear upper flange has a configuration similar to that of the front upper flange 52A, similar effects are achieved. Therefore, it is possible to more easily maintain the rigidity of the steering support.

(2b) Compared to the front upper flange 52 in the first embodiment, it is possible to enlarge a radius of curvature to form the folded portion 522A in the front upper flange 52A. Since the rear upper flange has a configuration similar to that of the front upper flange 52A, similar effects are achieved. Therefore, the front upper flange 52A and the rear upper flange can be formed more easily. As a result, it is also possible to improve the productivity of the steering support.

(2c) In the front upper flange 52A, the spacer portion 5221 is formed by folding back in the direction away from the lower member 4. With this configuration, compared to a case where the spacer portion 5221 is formed by folding back toward the lower member 4, the elongated portion 521, the contact portion 5222, and the front lower flange 42 can be more easily brought into surface contact with each other. As a result, the elongated portion 521, the contact portion 5222, and the front lower flange 42 can be more easily welded to each other. Since the rear upper flange has a configuration similar to that of the front upper flange 52A, similar effects are achieved. Therefore, the rigidity of the flange portions 42, 43, and 52A can be further enhanced. As a result, the rigidity of the steering support can be more easily maintained. It is also possible to improve the productivity of the steering support.

3. Third Embodiment

[3-1. Configuration]

The third embodiment has a basic configuration similar to that of the first embodiment, and therefore, the differences will be described below. The reference numeral identical to that in the first embodiment indicates the same configuration and refers to the preceding description.

Figure 13:
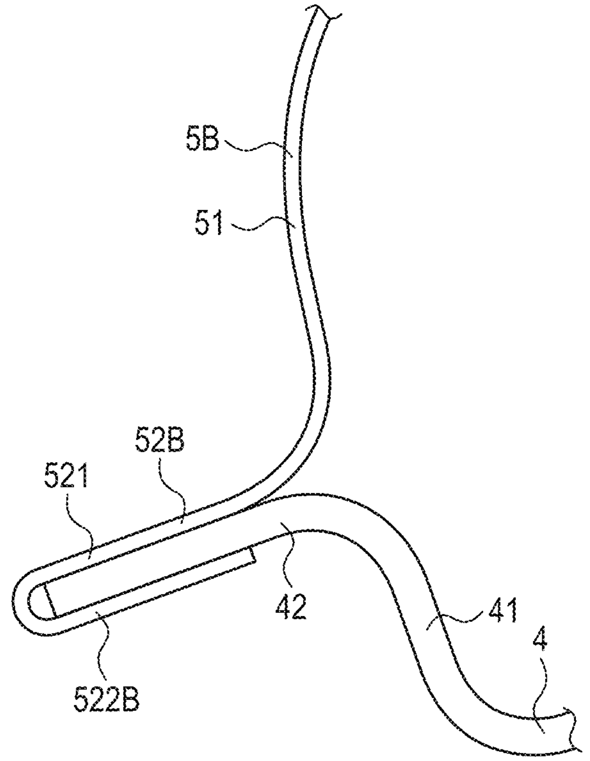
FIG. 13 is a schematic cross-sectional view of a front lower flange and a front upper flange of a third embodiment.

The steering support of the third embodiment shown in FIG. 13 includes an upper member 5B instead of the upper member 5 described above. The upper member 5B includes a front upper flange 52B and a rear upper flange (not shown) instead of the front upper flange 52 and the rear upper flange 53 described above. The front upper flange 52B and the rear upper flange have substantially similar configurations, and thus, the following will describe the front upper flange 52B in detail, and the description of the rear upper flange will be omitted.

The front upper flange 52B includes a folded portion 522B instead of the aforementioned folded portion 522. The folded portion 522B is formed by folding back the first end portion of the elongated portion 521, the end portion being opposite the second end portion of the elongated portion 521, the second end portion being directly connected to the upper main body 51, as in the case of the aforementioned folded portion 522. The folded portion 522B is formed by folding back the first end portion opposite the second end portion directly connected to the upper main body 51, as in the case of the aforementioned folded portion 522, toward the front lower flange 42.

The folded portion 522B is folded back so as to sandwich the front lower flange 42 together with the elongated portion 521. The folded portion 522B is in surface contact with the front lower flange 42 and is not in surface contact with the elongated portion 521. The folded portion 522B is welded to the elongated portion 521 and the front lower flange 42. The front lower flange 42 includes a first surface and a second surface, and the first surface is in surface contact with the elongated portion 521 and the second surface is in surface contact with the folded portion 522B. Both surfaces of the front lower flange 42 are in surface contact with the elongated portion 521 and the folded portion 522B.

[3-2. Effects]

According to the third embodiment described in detail above, the following effects can be obtained in addition to the effects similar to those described in (1a), (1b), and (1d) above.

In the front upper flange 52B, the folded portion 522B is folded back so as to sandwich the front lower flange 42 together with the elongated portion 521. The folded portion 522B is in surface contact with the front lower flange 42. With this configuration, compared to the front upper flange 52 of the first embodiment, it is possible to enlarge a radius of curvature to form the folded portion 522B in the front upper flange 52B. Since the rear upper flange has a configuration similar to that of the front upper flange 52B, similar effects are achieved. Therefore, the front upper flange 52B and the rear upper flange can be formed more easily. As a result, it is also possible to improve the productivity of the steering support.

4. Fourth Embodiment

[4-1. Configuration]

The fourth embodiment has a basic configuration similar to that of the first embodiment, and therefore, the differences will be described below. The reference numeral identical to that in the first embodiment indicates the same configuration and refers to the preceding description.

Figure 14:
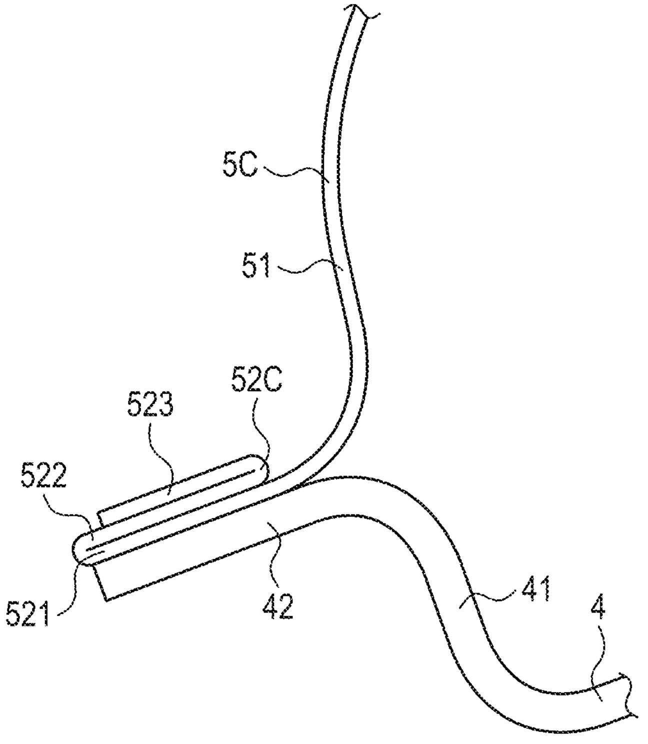
FIG. 14 is a schematic cross-sectional view of a front lower flange and a front upper flange of a fourth embodiment.

The steering support of the fourth embodiment shown in FIG. 14 includes an upper member 5C instead of the upper member 5 described above. The upper member 5C includes a front upper flange 52C and a rear upper flange (not shown) instead of the front upper flange 52 and the rear upper flange 53 described above. The front upper flange 52C and the rear upper flange have substantially similar configurations, and thus, the following will describe the front upper flange 52C in detail, and the description of the rear upper flange will be omitted.

The front upper flange 52C includes a folded portion 523 in addition to the aforementioned elongated portion 521 and folded portion 522. Hereinafter, to distinguish between the two folded portions 522 and 523, the two folded portions 522 and 523 will be referred to as a first folded portion 522 and a second folded portion 523, respectively.

The second folded portion 523 is formed by folding back a first end portion of the first folded portion 522, the first end portion being opposite a second end portion of the first folded portion 522, the second end portion being directly connected to the elongated portion 521. The second folded portion 523 is formed by folding back in a direction away from the elongated portion 521. The first folded portion 522 is formed by folding back in the direction away from the lower member 4 (more specifically, the front lower flange 42). Thus, in other words, the second folded portion 523 is formed by folding back in the direction away from the lower member 4. The second folded portion 523 is in surface contact with the first folded portion 522. The second folded portion 523 is welded to the elongated portion 521, the first folded portion 522, and the front lower flange 42.

The first folded portion 522 includes a first surface and a second surface, and the first surface is in surface contact with the second folded portion 523 and the second surface is in surface contact with the elongated portion 521. Both surfaces of the first folded portion 522 are in surface contact with the elongated portion 521 and the second folded portion 523. The elongated portion 521 includes a first surface and the second surface, and the first surface is in surface contact with the first folded portion 522 and the second surface is in surface contact with the front lower flange 42. Both surfaces of the elongated portion 521 are in surface contact with the first folded portion 522 and the front lower flange 42. In a state where they are in surface contact with each other, the elongated portion 521, the first folded portion 522, the second folded portion 523, and the front lower flange 42 are welded to each other.

[4-2. Effects]

According to the fourth embodiment described in detail above, the following effects can be obtained in addition to the effects similar to those described in the first embodiment.

The front upper flange 52C further includes the second folded portion 523. The second folded portion 523 is formed by folding back the first end portion of the first folded portion 522, the first end portion being opposite the second end portion of the first folded portion 522, the second end portion being directly connected to the elongated portion 521. The second folded portion 523 is welded to the elongated portion 521, the first folded portion 522, and the front lower flange 42 while being in surface contact with the first folded portion 522. With this configuration, the front upper flange 52C further includes the second folded portion 523, thereby increasing a total plate thickness of the front upper flange 52C. Since the rear upper flange has a configuration similar to that of the front upper flange 52C, similar effects are achieved. Therefore, the rigidity of the overall steering support can be further enhanced.

5. Fifth Embodiment

[5-1. Configuration]

The fifth embodiment has a basic configuration similar to that of the first embodiment, and therefore, the differences will be described below. The reference numeral identical to that in the first embodiment indicates the same configuration and refers to the preceding description.

Figure 15:
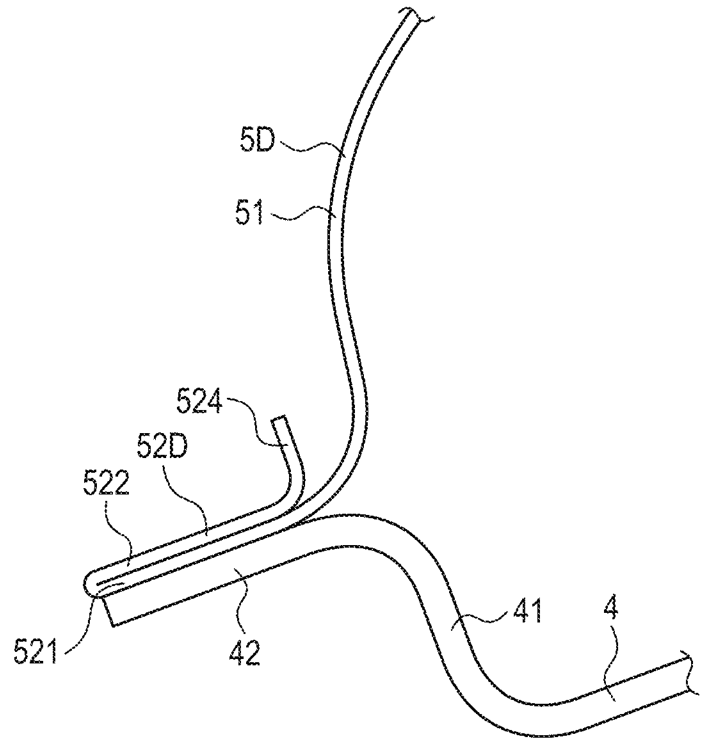
FIG. 15 is a schematic cross-sectional view of a front lower flange and a front upper flange of a fifth embodiment.

The steering support of the fifth embodiment shown in FIG. 15 includes an upper member 5D instead of the upper member 5 described above. The upper member 5D includes a front upper flange 52D and a rear upper flange (not shown) instead of the front upper flange 52 and the rear upper flange 53 described above. The front upper flange 52D and the rear upper flange have substantially similar configurations, and thus, the following will describe the front upper flange 52D in detail, and the description of the rear upper flange will be omitted.

The front upper flange 52D includes a tip-bent portion 524 in addition to the aforementioned elongated portion 521 and folded portion 522. The tip-bent portion 524 extends in a direction crossing the folded portion 522, from a first end portion of the folded portion 522, the first end portion being opposite a second end portion of the folded portion 522, the second end portion being directly connected to the elongated portion 521. The tip-bent portion 524 extends away from the elongated portion 521. The tip-bent portion 524 faces the upper main body 51.

[5-2. Effects]

According to the fifth embodiment described in detail above, the following effects can be obtained in addition to the effects similar to those described in the first embodiment.

The front upper flange 52D further includes the tip-bent portion 524. The tip-bent portion 524 extends in a direction crossing the folded portion 522, from the first end portion of the folded portion 522, the first end portion being opposite the second end portion directly connected to the elongated portion 521. With this configuration, the front upper flange 52D further includes the tip-bent portion 524, thereby further enhancing the rigidity of the front upper flange 52D. The rear upper flange has a configuration similar to that of the front upper flange 52D, thereby achieving the same effect. Therefore, the rigidity of the overall steering support can be further enhanced.

6. Other Embodiments

The embodiments of the present disclosure have been described; however, the present disclosure is not limited to the above-described embodiments, and the present disclosure can be practiced in various forms.

Figure 16:
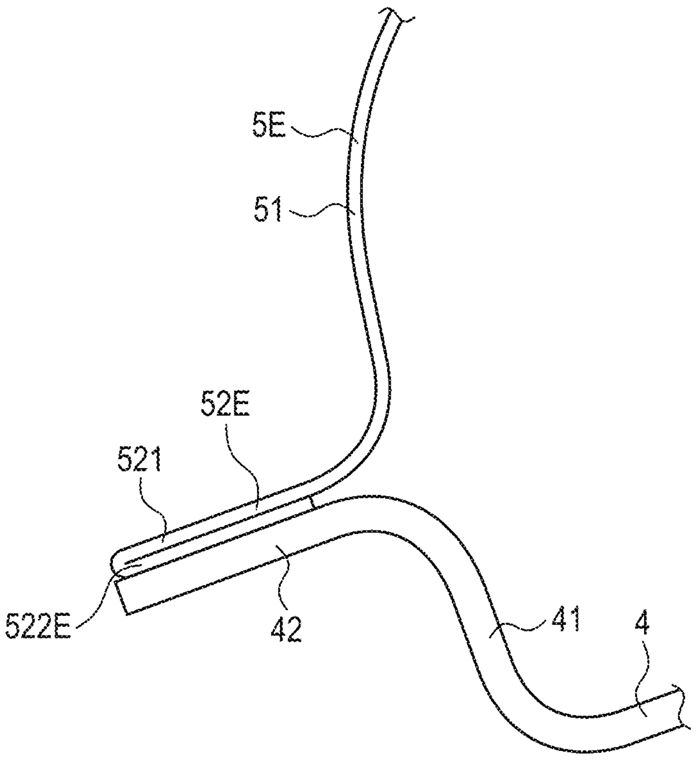
FIG. 16 is a schematic cross-sectional view of a front lower flange and a front upper flange of a modified example.

(6a) In the first, second, fourth, and fifth embodiments described above, the folded portions 522, 522A, 522B, 523, and 532 are formed by folding back upward (i.e., in the direction away from the lower member 4). However, the direction in which the folded portion is folded back is not particularly limited. For example, as in the case of the folded portion 522B in the third embodiment and a folded portion 522E in the modified example shown in FIG. 16, the folded portion may be formed by folding back downward (i.e., toward the lower member 4). As shown in FIG. 16, the folded portion 522E in the modified example is a portion included in the front upper flange 52E of the upper member 5E. The folded portion 522E of the modified example is welded to the elongated portion 521 and the front lower flange 42 while being in surface contact with both the elongated portion 521 and the front lower flange 42. In the modified example shown in FIG. 16, the rear upper flange may be configured similarly to the front upper flange 52E, for example.

(6b) In the first embodiment, laser welding is exemplified as a welding method for the front lower flange 42 and the front upper flange 52, and the rear lower flange 43 and the front upper flange 53. However, the welding method for the front lower flange and the front upper flange, and the rear lower flange and the rear upper flange, is not particularly limited. For example, the welding method may be arc welding, spot welding, and the like.

(6c) A function performed by a single component in the aforementioned embodiments may be distributed to a plurality of components, and functions performed by a plurality of components may be achieved by a single component. A part of the configuration of the aforementioned embodiments may be omitted. At least part of the configuration of the aforementioned embodiments may be added to, or replaced with, the configuration of other embodiments described above.

What is claimed is:

1. A steering support configured to be mounted in a vehicle and to support a steering of the vehicle from above, the steering support comprising:

a lower member including a plate member; and an upper member that includes a plate member having a plate thickness smaller than a plate thickness of the lower member and that is arranged above the lower member, wherein the lower member includes: a lower main body curved downward in a convex shape in a cross-section taken along a front-rear direction of the vehicle; a front lower flange extending from a front edge of the lower main body; and a rear lower flange extending from a rear edge of the lower main body, wherein the upper member includes: an upper main body that is curved upward in a convex shape in a cross-section taken along the front-back direction of the vehicle and that forms a space between the upper main body and the lower main body; a front upper flange extending from a front edge of the upper main body; and a rear upper flange extending from a rear edge of the upper main body, wherein each of the front upper flange and the rear upper flange includes: an elongated portion extending from the upper main body; and a folded portion formed by folding back a first end portion of the elongated portion, the first end portion being opposite a second end portion of the elongated portion, the second end portion being directly connected to the upper main body, wherein the folded portion of the front upper flange is welded to the elongated portion of the front upper flange and the front lower flange while being in surface contact with at least one of the elongated portion of the front upper flange or the front lower flange, and wherein the folded portion of the rear upper flange is welded to the elongated portion of the rear upper flange and the rear lower flange while being in surface contact with at least one of the elongated portion of the rear upper flange or the rear lower flange.

2. The steering support according to claim 1, wherein in each of the front upper flange and the rear upper flange, the folded portion is in surface contact with at least the elongated portion, a ratio of a total plate thickness of the front upper flange to a plate thickness of the front lower flange is 0.5 or more and 2.0 or less, and a ratio of a total plate thickness of the rear upper flange to a plate thickness of the rear lower flange is 0.5 or more and 2.0 or less.

3. The steering support according to claim 1, wherein in each of the front upper flange and the rear upper flange, the folded portion includes: a spacer portion formed by folding back the elongated portion so as to form a space between the spacer portion and the elongated portion; and a contact portion extending from a first end portion of the spacer portion, the first end portion being opposite a second end portion of the spacer portion, the second end portion being directly connected to the elongated portion, the contact portion being in surface contact with at least the elongated portion.

4. The steering support according to claim 2, wherein in each of the front upper flange and the rear upper flange, the folded portion includes: a spacer portion formed by folding back the elongated portion so as to form a space between the spacer portion and the elongated portion; and a contact portion extending from a first end portion of the spacer portion, the first end portion being opposite a second end portion of the spacer portion, the second end portion being directly connected to the elongated portion, the contact portion being in surface contact with at least the elongated portion.

5. The steering support according to claim 3, wherein in each of the front upper flange and the rear upper flange, the spacer portion is formed by folding back in a direction away from the lower member.

6. The steering support according to claim 4, wherein in each of the front upper flange and the rear upper flange, the spacer portion is formed by folding back in a direction away from the lower member.

7. The steering support according to claim 1, wherein in each of the front upper flange and the rear upper flange, the folded portion has a dimension of 9 mm or more from an end edge directly connected to the elongated portion to an end edge opposite the end edge directly connected to the elongated portion.

* * * * *